Nov. 28, 1939.    H. C. DAVIS    2,181,177
PROCESS OF DEPOSITION
Filed May 26, 1937    2 Sheets-Sheet 1
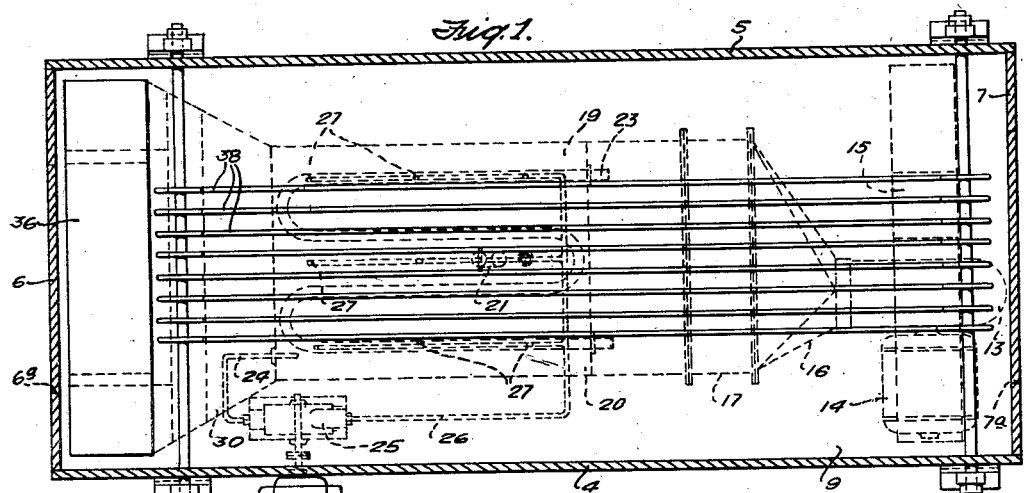
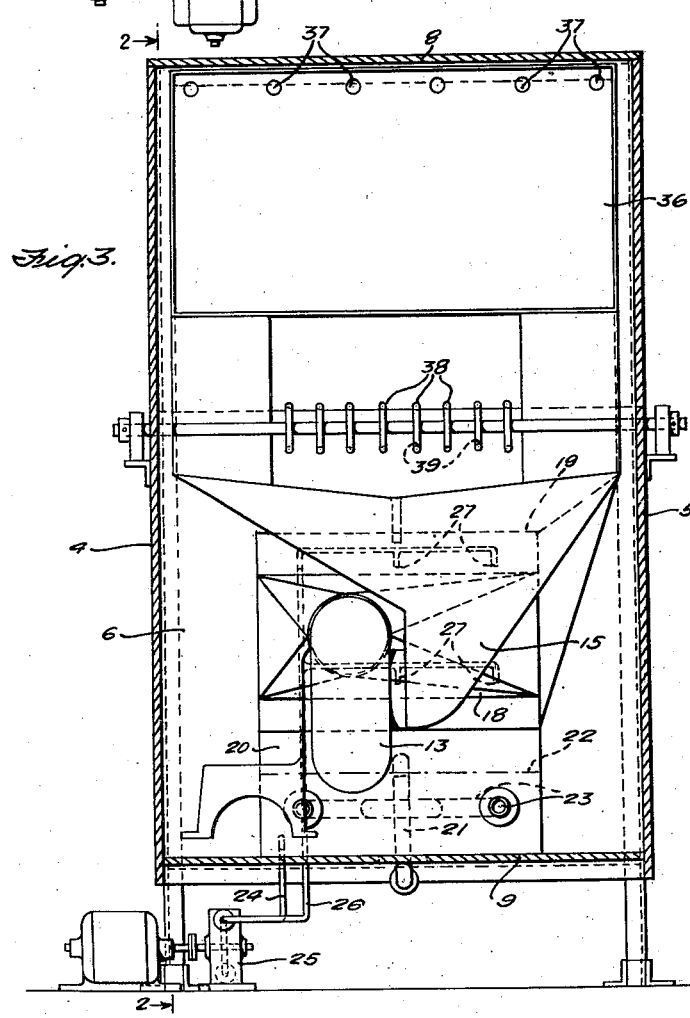
INVENTOR
Howard C. Davis
BY
ATTORNEY

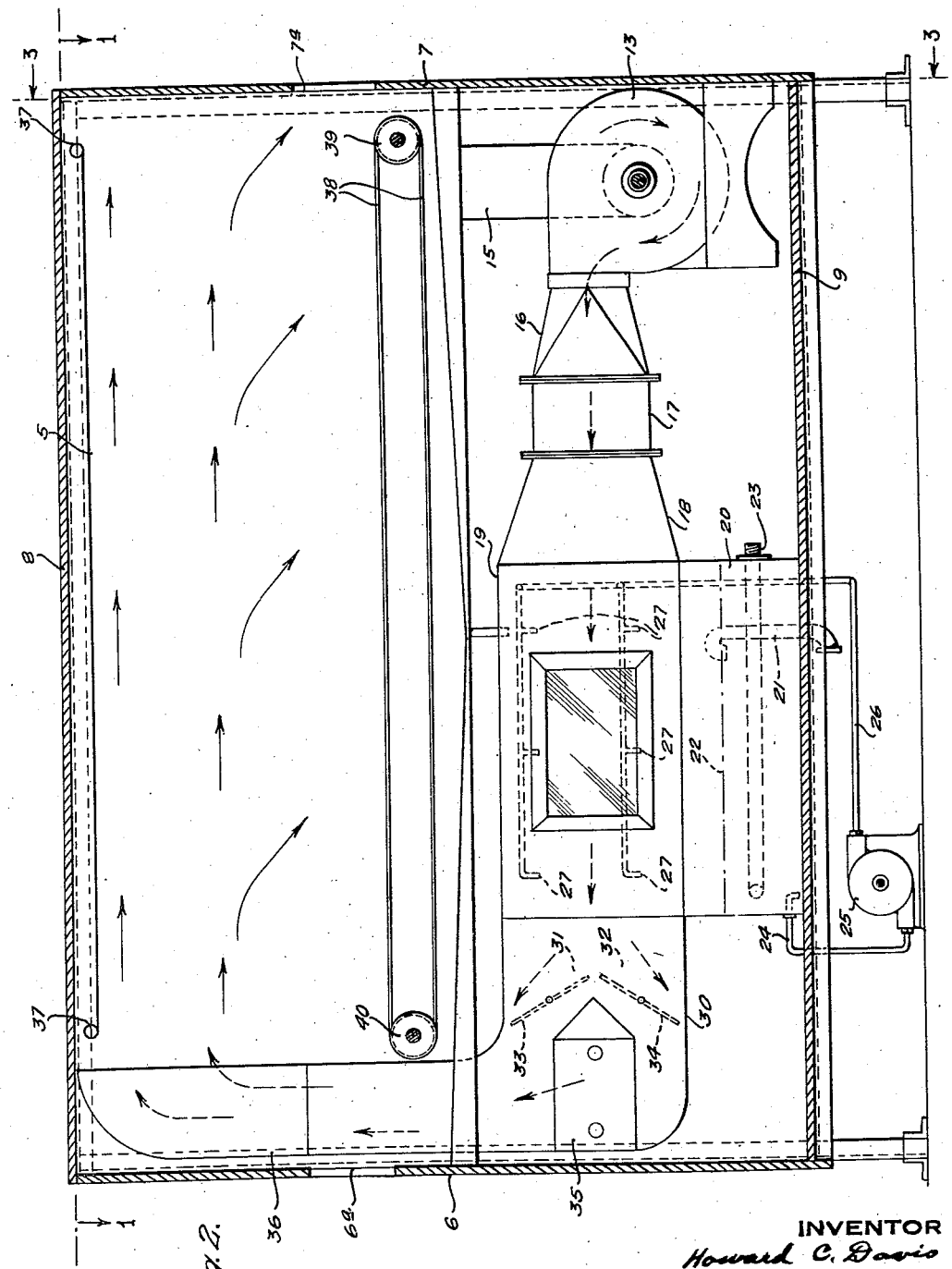

Patented Nov. 28, 1939

2,181,177

UNITED STATES PATENT OFFICE 2,181,177

PROCESS OF DEPOSITION

Howard C. Davis, Elizabeth, N. J.

Application May 26, 1937, Serial No. 144,812

3 Claims. (Cl. 99—213)

The invention herein disclosed relates to a process for treating material by depositing a substance upon the materials. More particularly, the process consists in effecting the deposition of substances in finely divided or atomized forms.

This process essentially comprises utilizing a gas as a carrier for a substance to be deposited upon the material to be treated. The gas is saturated with the substance and then brought into contact with the material to be treated. The relative temperature of the saturated gas and the material to be treated are so maintained that condensation takes place upon the gas coming into contact with the material to be treated. This temperature difference between the saturated gas and the material, and the time of exposure of the material to be treated to the saturated gas determines the quantity of the substance deposited during a particular application.

More specifically, air may be used as the conveying gas. When air is so used, it is first dehumidified by any of the methods now employed for reducing the moisture content of air. For example, the air may be circulated over or through beds charged with an absorbent having an affinity for moisture such as calcium chloride, silica gel or aluminum salts. Likewise, the moisture content of the air may be materially reduced by lowering the temperature of the air. In dehumidifying the air in this way, the air is circulated over or through a series of coils through which a refrigerant is circulated. When so cooled, all moisture above the saturation point of the air at the lower temperature is removed.

The air so reduced in moisture content is then passed through a heating chamber in which the temperature of the air is raised substantially. This may be accomplished by employing in the heating chamber ordinary heating coils through which steam or hot water passes. The elevation of the temperature of the air raises the saturation point of the air and further reduces the relative humidity.

This heated air is then passed through a vaporization chamber. In this chamber, the air is brought into contact with the substance to be deposited. Normally, the substance to be deposited on the material to be treated is a liquid and the liquid is atomized in the vaporization chamber and the heated air passes through the atomized liquid formed in the chamber. The atomized liquid is absorbed by the dry heated air until the liquid content of the air corresponds to its saturation point at the temperature thereof.

The saturated air is next circulated through a treating chamber that contains the material to be treated. The temperature to which the air is heated is such, relative to the temperature of the material to be treated, that condensation takes place when the saturated air comes into contact with the material in the treating chamber. For certain treatments the material to be treated may be moved continuously through the treating chamber and for others, the material may remain in the treating chamber for a considerable period of time while saturated air is being continuously circulated through the treating chamber. The amount of the substance deposited will as previously stated depend upon the relative temperatures of the saturated air and the material to be treated and the time saturated air is circulated in contact with the material to be treated.

This process may be used for many different effects. It is suitable, for example, for sterilizing and impregnating materials, for film coating exposed surfaces of materials, dyeing fabrics, and the electrolytic deposition of metals. Examples of these more common uses of the process are given below but the process is likewise suitable for many other purposes as will be suggested by the examples.

The process is especially suitable, for example, in the baking industry for the fixation of mould spores that cultivate on the surface of bread and other baked products. In this process, the carrier gas used is air and the substance used to effect the fixation of the mould spore is a grain vinegar of a commercial grade. Throughout the process there is no chemical change effected in the vinegar; its physical characteristics are changed from a liquid to a vapor and back to a liquid. In the manner previously described, air is treated to reduce its moisture content and it is then heated. Next it is passed through a vaporization chamber that is maintained filled with atomized vinegar vapor. The vinegar vapor is absorbed by the dry heated air and carried to the treating chamber where it is deposited on the bread that passes through the treating chamber. The deposited vinegar is absorbed by the bread and serves to effect a fixation of mould spore.

One form of the apparatus that may be used in treating bread in this manner is illustrated in the accompanying drawings in which:

Fig. 1 is a plan thereof;

Fig. 2 is a sectional side; and

Fig. 3 is an end elevation of the same.

The whole apparatus is enclosed in a heat insulated casing 1 mounted upon and supported by a frame member and having standards 3 at each corner thereof. The casing 1 includes side walls 4 and 5, and walls 6 and 7, a top 8 and a bottom wall 9, forming a completely closed chamber except for aligned openings 6a and 7a in the end walls 6 and 7. A horizontal partition 10 divides the casing into a treating chamber 11 and a conditioning chamber 12.

In the conditioning chamber 12 there is mounted a fan or blower 13 that is driven by a motor 14. The inlet end of the blower is connected through a conduit 15 to the bottom of the treating chamber 12 adjacent the end wall 7. The outlet or pressure end of the blower is connected by a diverging conduit 16 to a heating chamber 17. Within the heating chamber 17 there is mounted a series of heating coils through which a heating medium such as steam or hot water is circulated. The outlet end of the heating chamber is connected by a conduit 18 to the inlet end of a vaporizing chamber 19. Within the vaporizing chamber, there is provided a sump 20 that is provided with an overflow pipe 21. The line 22 indicates the normal level of the liquid vinegar within the sump. A heating coil 23 is mounted in the sump below the level of the liquid. Any ordinary level control apparatus may be utilized for controlling the flow of liquid from the supply to the sump to maintain the liquid in the sump at the level indicated by the dotted line designated by the numeral 22. Liquid is drawn from the sump through a pipe 24 that is connected to the intake end of a circulation pump 25. The discharge end of the pump 25 is connected by a conduit 26 to a series of spray nozzles 27 mounted in the vaporization chamber. These spray nozzles are designed to effect an atomization of the liquid vinegar that is delivered to them under the pressure of the circulating pump 25. The continuous operation of the pump causes the vaporization chamber to be continuously filled with the vinegar vapor. The heated and dry air in passing through this vapor, absorbs the vapor. Any excess of the vapor falls to the sump.

The outlet end of the vaporization chamber is connected to a conduit 30 that has two passages 31 and 32. The flow of air through the passage 31 is controlled by a damper 33 and the flow of air through the passage 32 is controlled by a damper 34. In the passage 32, there is a cooler 35 for reducing the temperature of the air to effect a dehumidification of the air. The passage 31 by-passes the cooler. The passages 31 and 32 are joined together above the opening 6a in the side wall 6 in a conduit 36. The conduit 36 discharges into the treating chamber adjacent the top thereof and adjacent the side wall 6. The saturated air thus passes from one end of the chamber, through the chamber to the other opposite end where the outlet conduit 15 is located.

In utilizing the apparatus, the damper 31 may be closed in the first instance so that the air is forced through the cooler 35. While the air is being forced through the cooler it will not be heated nor will the pump 25 be operating. The air will be dehumidified as previously explained by lowering the temperature thereof. After the air has been sufficiently dehumidified, the heater 17 will operate and the pump 25 will be operated to effect a vapor in the vaporization chamber. The damper 32 will of course then be closed and the damper 31 opened for the cooler is no longer necessary when once the air has been dehumidified. The air will then pass through the heater, the spray chamber, the passage 31, conduit 36, and the treating chamber. It may be continuously circulated, being reheated and re-saturated each time it passes through the cycle.

In the treating chamber, there are provided coils 37 for controlling the temperature within the treating chamber. Near the bottom of the treating chamber there is provided a conveyor belt 38 that is mounted on drums 39 and 40, one adjacent each end of the treating chamber. The conveyor is a wire belt conveyor being formed of a series of wires as clearly shown in Fig. 3. The bread to be treated is passed into the treating chamber through the opening 7a in the side wall 7 and onto the conveyor belt. The bread may be delivered to the conveyor belt after it has been cooled to the temperature at which it is wrapped, usually between 95° and 110° F. The temperature of the circulating saturated air will of course be much higher, approximately 30° to 40° higher than the temperature of the bread so that when the air comes in contact with the bread, the vaporized vinegar carried by the air will condense and be deposited upon the bread. The bread passes slowly through the treating chamber and is discharged at the outlet 6a and may be delivered directly to the slicing and wrapping machines. The openings 6a and 7a may be closed by suitable flaps to prevent the circulating air within the apparatus from passing out to the atmosphere. No air will pass into the chamber since the pressure of the air within the chamber is slightly greater than atmospheric pressure. Below the conveyor belt, there is provided a drain partition 38 which is connected at the lower end to a drain pipe 39 that discharges into the spray chamber 19. Any of the vinegar, condensed within the chamber, and dripping, will thus flow back to the vaporization chamber.

The temperature of the vinegar in the sump 20 will be controlled by an aquastat which will control the amount of heating medium that is circulated through the coils 23. Similarly, a thermostat will control the temperature to which the air is initially heated by controlling the flow of heating medium to the coils in the heating chamber 17. The thermostat will also be used for controlling the temperature through the coils 37 within the bread treating chamber. The entire apparatus is thus readily made entirely automatic and continuous in operation.

As the bread passes through the treating chamber on the conveyor belt, it becomes enveloped in a fog of vinegar and the vinegar condenses on the entire surface of the bread. Upon being deposited on the bread, the vinegar is absorbed by the bread with the effect that there is a fixation of all mould spores on the surface of the bread.

Another application of this process is the dyeing of fabrics. Those fabrics that are basically composed of proteins or cellulose such as silk, wool, cotton, linens, hemp, jute, rayons and the like, may be dyed by depositing the dye upon the fabric in the same manner as the vinegar is deposited upon the surface of the bread. In the dyeing of fabrics, however, there is utilized as the treating substance either a water soluble dye or a dye that is soluble in some liquid chemical. The fabric in the treating chamber is preferably drawn over a chilled surface so that the dye is immediately condensed when coming in contact with the fabric and the fabric has the dye deposited thereon as it passes through the treating chamber. When the dye is deposited upon the fabric, depending upon the nature of the dyestuff used, the dye will either adhere to the surface of the fabric or the fabric will be impregnated with the dye.

As an alternative in the precipitation of dyestuff upon a fabric, a series of slotted tubes may be used instead of the chilled surface. In this arrangement the tubes are connected to a suction pump to create a subatmospheric pressure or vacuum within the tubes. With this arrangement, the sudden change in pressure when the saturated air comes into contact with the fabric causes a precipitation upon the fabric.

In a similar manner, paper or other materials may be coated. For example, a water soluble or liquid wax may be utilized for coating paper. The wax is dissolved in water to form a water solution of the wax in the same manner as the dye is dissolved in water or a chemical solvent. The solution of wax and the solvent is vaporized in the vaporization chamber and absorbed by the air. In the treating chamber the solvent carrying the wax is deposited upon the paper leaving a thin smooth film of wax when the moisture is evaporated.

A further application of the process is in lacquer coating of various materials. When lacquer is used as the vehicle for a pigment, the lacquer containing the pigment is atomized and the lacquer-laden air is delivered to the treating chamber where it is precipitated or condensed upon the surface of the material to be treated. In this way, metal, wood, fiber, glass or other materials may be given a thin coating of lacquer.

A further application of the process may be found in electroplating. When applied to electroplating, there is introduced into the process electrical energy for the purpose of breaking down the molecules of the substance that is utilized in the plating process. The surface of the metal to be plated or coated is cleaned of all fatty substances and oxides in the usual manner. This cleaning may also be effected by condensing solvents upon the surface of the metal in the manner utilized for coating surfaces or depositing vapors upon materials heretofore described. When the metal is cleaned in this way, the electric energy is not utilized during the cleaning process. The cleaned material is then introduced into the treating chamber and attached to the negative terminal of an electric circuit. The material to be electroplated is preferably suspended in the treating chamber so that all of the surface will be available for the condensation of the vapors. A piece of metal of the same kind as that being treated is also suspended in the treating chamber and attached to the positive terminal of the electric circuit so that the metal to be plated forms the negative or cathode of the electric circuit and the piece of like metal also suspended in the treating chamber forms the positive electrode.

If it is desired to copper-plate the metal a solution of copper sulphate is used in the vaporization chamber. If silver-plating is desired a solution of cyanide of potassium is used. With copper-plating, the copper sulphate is dissolved in water and atomized in the treating chamber in the manner heretofore described. The air absorbs the solution of copper sulphate and carries it to the treating chamber. In the treating chamber, the positive ions Cu are separated from the negative electrons $SO_4$ by the influence of the anode and cathode within the treating chamber. The sulphate electrons are of course drawn to the anode and the copper ions are drawn to the cathode to which they are attached and to which their positive charge is given up. In this way, a film of metallic copper is deposited upon the metal being plated.

In like manner the process may be used for cleaning surfaces to which foreign matter has adhered. An example of this is the cleaning of a surface from free carbon, loam and asphalt that adheres to the surface of fuel oil heaters and the like. When utilizing the process in this manner, carbon tetrachloride is used in the vaporization chamber. It is a well known fact that this liquid serves as an active solvent for breaking down the bond of such surface coatings and it is also known that the vapors of carbon tetrachloride are more active in this respect than when the material is used in a liquid state. As in the previous applications of the process, the material to be cleaned is introduced in the treating chamber and the vapors of carbon tetrachloride are deposited thereon. When the vapors are deposited on the material, the coating is left soft or in a disintegrated state and may be easily removed by being subjected to air or liquid currents of high velocities.

It will of course be appreciated that the apparatus hereinbefore described is ideally suitable for the process when used in the sterilization of bread. In utilizing the process for others of the examples given, modifications of the apparatus may be more suitable than the apparatus described for the treatment of bread. Such modifications will however readily occur to those skilled in the art.

It will be obvious that the process hereinbefore described has applications in addition to those that have been described by way of example and that those skilled in the art may make changes in the steps of the process as described above within the principle and scope of the invention as expressed in the appended claims.

I claim:

1. The continuous process for sterilizing a series of articles by effecting a uniform deposition of a liquid substance having the property of effecting sterilization over the surfaces of the articles which process comprises utilizing a carrier substance that is in a gaseous state under normal atmospheric conditions for conveying the sterilizing liquid to be deposited on the articles, the gaseous carrier being substantially chemically inert with respect to the liquid substance and the article, and which process includes the steps of fixing the temperature and relative humidity of the gaseous carrier, dividing the sterilizing liquid into finely divided form in an atomizing chamber, maintaining the temperature of the liquid substance below the boiling point thereof, moving the articles to be treated in continuous succession through a treating chamber, continuously circulating the gaseous carrier in a cycle including a heating chamber to maintain the temperature of the gaseous carrier at a temperature to effect condensation of the sterilizing liquid on the articles, the atomizing chamber and the treating chamber, whereby the sterilizing liquid is converted into a gaseous state and carried by the gaseous carrier to the treating chamber wherein it is reconverted to the liquid state and deposited on the surfaces of the articles.

2. The continuous process for sterilizing bakery products by effecting a uniform deposition of a mould inhibiting liquid over the surface of the bakery products, which process comprises utilizing air as a carrier medium for conveying the mould inhibiting liquid in finely divided form to the bakery products and which process includes the steps of dehumidifying the air, dividing the mould inhibiting liquid into finely divided form in an atomizing chamber, maintaining the temperature of the liquid below the boiling point thereof, moving the bakery products in continuous succession through a treating chamber, continuously circulating the air in a cycle including a heating chamber for maintaining the temperature of the air at a temperature to effect condensation of the mould inhibiting liquid on the bakery products, and the atomizing and treating chambers, whereby the mould inhibiting liquid is converted into a gaseous state and carried by the air to the treating chamber wherein it is reconverted to the liquid state and deposited on the surfaces of the bakery products.

3. The continuous process for sterilizing bakery products by effecting a uniform deposition of vinegar over the surface of the bakery products which process comprises utilizing air as a carrier medium for conveying the vinegar in finely divided form to the bakery products and which process includes the steps of dehumidifying the air, dividing the vinegar into finely divided form in an atomizing chamber, maintaining the temperature of the vinegar below the boiling point thereof, moving the bakery products in continuous succession through a treating chamber, continuously circulating the air in a cycle including a heating chamber for maintaining the temperature of the air at a temperature to effect condensation of the vinegar on the bakery products, the atomizing chamber and the treating chamber, whereby the vinegar is converted into a gaseous state and carried by the air to the treating chamber wherein it is reconverted to the liquid state and deposited on the surfaces of the bakery products.

HOWARD C. DAVIS.